(12) United States Patent
Nagase et al.

(10) Patent No.: US 7,689,836 B2
(45) Date of Patent: Mar. 30, 2010

(54) ENCRYPTION DEVICE

(75) Inventors: Takeshi Nagase, Kawasaki (JP); Shogo Shibazaki, Kawasaki (JP); Shinkichi Gama, Kawasaki (JP)

(73) Assignee: Fujitsu Microelectronics Limited, Yokohama (JP)

( * ) Notice: Subject to any disclaimer, the term of this patent is extended or adjusted under 35 U.S.C. 154(b) by 1058 days.

(21) Appl. No.: 11/312,611

(22) Filed: Dec. 21, 2005

(65) Prior Publication Data
US 2007/0165864 A1    Jul. 19, 2007

Related U.S. Application Data (63) Continuation of application No. PCT/JP03/08669, filed on Jul. 8, 2003.

(51) Int. Cl.
    *H04L 9/32*    (2006.01)
    *H04L 9/00*    (2006.01)
(52) U.S. Cl. .................... 713/189; 713/193; 380/277
(58) Field of Classification Search ......... 380/277–279, 380/281, 284; 713/189–190, 192–194; 726/26–27
    See application file for complete search history.

(56) References Cited

U.S. PATENT DOCUMENTS 5,363,447 A * 11/1994 Rager et al. ................ 380/273
5,633,934 A *  5/1997 Hember ...................... 713/192
6,457,126 B1    9/2002 Nakamura et al.

FOREIGN PATENT DOCUMENTS

| EP | 0 647 079 A1 | 4/1995 |
|---|---|---|
| EP | 1 056 015 A1 | 11/2000 |
| JP | 61-021641 | 1/1986 |
| JP | 1-151846 | 6/1989 |
| JP | 7-162412 | 6/1995 |
| JP | 8-328759 | 12/1996 |
| JP | 11-510678 | 9/1999 |
| JP | 2001-22646 | 1/2001 |
| JP | 2001-103045 | 4/2001 |
| WO | 99/38078 | 7/1999 |

OTHER PUBLICATIONS

Partial English Translation of JP 61-21641 (Reference AC in the Information Disclosure Statement filed Jun. 20, 2006).
Partial English Translation of JP 1-151846 (Reference AD in the Information Disclosure Statement filed Jun. 20, 2006).
Japanese Office Action issued on Feb. 17, 2009 in corresponding Japanese Patent Application 2005-503398.

\* cited by examiner

*Primary Examiner*—Hosuk Song (57) ABSTRACT

An encryption/decryption processing unit performs encryption/decryption processing of data transmitted from a host system, and encryption/decryption processing of key data used for encryption/decryption of the data. A key data buffer temporarily stores encrypted key data. A key data buffer temporarily stores unencrypted key data. An external memory interface controls flash memory attached outside, and reads/writes encrypted key data stored in the key data buffer.

8 Claims, 6 Drawing Sheets

ENCRYPTION DEVICE

CROSS REFERENCE TO RELATED APPLICATION

This application is a continuation of international PCT application No. PCT/JP2003/008669 filed on Jul. 8, 2003.

BACKGROUND OF THE INVENTION

1. Field of the Invention

The present invention relates to a technology for encryption of given data and, more specifically, to a technology for reducing cost of the encryption devices as well as for preventing increase in the ease of decryption by a third party and slowdown of encryption processing speed.

2. Description of the Related Art

In Patent Document 1, to be cited later, a memory device, for preventing stored data from being read out for misuse, is disclosed. The memory device adopts a configuration that data to be stored is encrypted and is stored in a high-capacity flash memory.

In the memory device, key data, which is a common key used as an encryption key in data encryption, is stored in a low-capacity memory for control unit, provided in a control unit of the flash memory. In this memory also, data encryption/decryption is performed in the decryption circuit configured in the above control unit. In such performance, the above key data is read from the memory for control unit and is used.

Patent Document 1:

Japanese laid-open disclosure public patent bulletin No. 2001-22646

In order to decrypt the encrypted data stored in the flash memory afterward, the same key data as the one used for the encryption is required, and for that reason, key data stored in the memory for control unit must be preserved even when power supply to the memory device is interrupted. However, it is desirable that key data can be changed to reduce the danger that the encrypted data can be decrypted by a third party as much as possible.

For high-speed performance of encryption and decryption processing, reading speed of the key data from memory for control unit is required to be sufficiently fast so that this speed does not bottleneck the entire processing speed.

In the past, in implementation of the memory device disclosed in the above Patent Document 1, when providing the control unit of the flash memory as a single chip integrated circuit element, in order to meet all of the above requirements, FeRAM (Ferroelectric Random Access Memory) is adopted and formed as memory for control unit to store the key data. However, adoption of the FeRAM raises manufacturing cost of the integrated circuit elements, and consequently increases the cost of the whole memory device.

Instead of storing the key data in the FeRAM formed on integrated circuit elements, a method, in which the key data is stored in a storage area of a part of the above flash memory or storage area of the other prepared flash memory, is also possible. However, data reading speed from the flash memory is considerably slower compared with the reading speed from FeRAM; therefore there is a concern about slowdown of the encryption processing and decryption processing.

In this method, there is also a danger of direct abstraction of the key data from the flash memory by a malicious third party, and the encrypted data can be decrypted using the key data.

DISCLOSURE OF THE INVENTION

The present invention is devised in view of the above problems, and it is an object of the present invention to provide an encryption device, in which, even if key data used for encryption of data and decryption of encrypted data is stored in involatile external memory unit, there is little danger that encrypted data can be decrypted by a third party, and considerable slowdown of processing speed in encryption processing and decryption processing can be prevented.

A device, which is one mode of the present invention, is an encryption device comprising an encryption processing unit for data encryption using key data used as an encryption key; an encrypted key data storage unit for storing encrypted key data, which is the key data encrypted in the encryption processing unit; an unencrypted key data storage unit for storing unencrypted key data stored in the encrypted key data storage unit; and an encrypted data memory control unit for writing the encrypted key data stored in the encrypted key data storage unit, controlling an involatile memory device.

According to this configuration, the involatile memory device stores the encrypted key data at the time of power supply interruption. Therefore, even when a third party abstracts the encrypted key data from the storage device, as long as the encrypted key data is not decrypted, the encrypted data cannot be decrypted.

Because unencrypted key data is stored in the unencrypted key data storage unit, the encryption processing unit can encrypt data using the key data. That is, data encryption can be performed in the encryption processing unit without performing decryption processing of the encrypted key data, and thus considerable slowdown of processing speed can be prevented in encryption processing.

In the above device relating to the present invention, it is possible that the encryption processing unit performs encryption processing of the data transmitted from a host system by using key data stored in the unencrypted key data storage unit.

In the device, described above, relating to the present invention, it is also possible that the encrypted data memory control unit controls writing the encrypted key data when the encryption processing by the encryption processing unit is not performed.

By so doing, operation for writing the encrypted key data in an involatile memory device would not disrupt flow of data encryption processing by the encryption processing unit.

In the above-described device relating to the present invention, it is possible that the encrypted data memory control unit, when starting up the device, controls reading the encrypted key data from the memory device and storing the encrypted key data in the encrypted key data storage unit.

By so doing, after start-up of the encryption device, encrypted key data is in the state that it is stored in the encrypted key data storage unit.

At that point, it is possible that the encryption processing unit is able to decrypt data encrypted on its own and performs decryption of the encrypted key data read by the encrypted data memory control unit in start-up of the device, and the key data, decrypted by the decryption processing, is stored in the unencrypted key data storage unit.

By so doing, after start-up of the encryption device, unencrypted key data is in the state that it is stored in the unencrypted key data storage unit.

In the above-described device relating to the present invention, it is possible that the unencrypted key data storage unit stores a plurality of the key data, and when rewriting instruction of the key data is transmitted from a host system, key data relating to the instruction alone among a plurality of key data stored in the unencrypted key data storage unit is rewritten.

By so doing, key data can be rewritten in short time compared with a case of rewriting all key data stored in the unencrypted key data storage unit.

Also, in the above-explained encryption device relating to the present invention, the encrypted key data storage unit stores a plurality of the encrypted key data, and when rewriting instruction of the key data is transmitted from a host system, key data relating to the instruction alone among a plurality of encrypted key data stored in the encrypted key data storage unit is encrypted by the encryption processing unit and is rewritten.

By so doing, key data can be rewritten in short time compared with a case of encryption and rewrite of all key data stored in the unencrypted key data storage unit.

BRIEF DESCRIPTION OF THE DRAWINGS

The present invention will be more apparent from the following detailed description in conjunction with the accompanying drawings, in which.

DESCRIPTION OF THE PREFERRED EMBODIMENT

In the following description, the preferred embodiments of the present invention are set forth based on the accompanying drawings.

Figure 1:
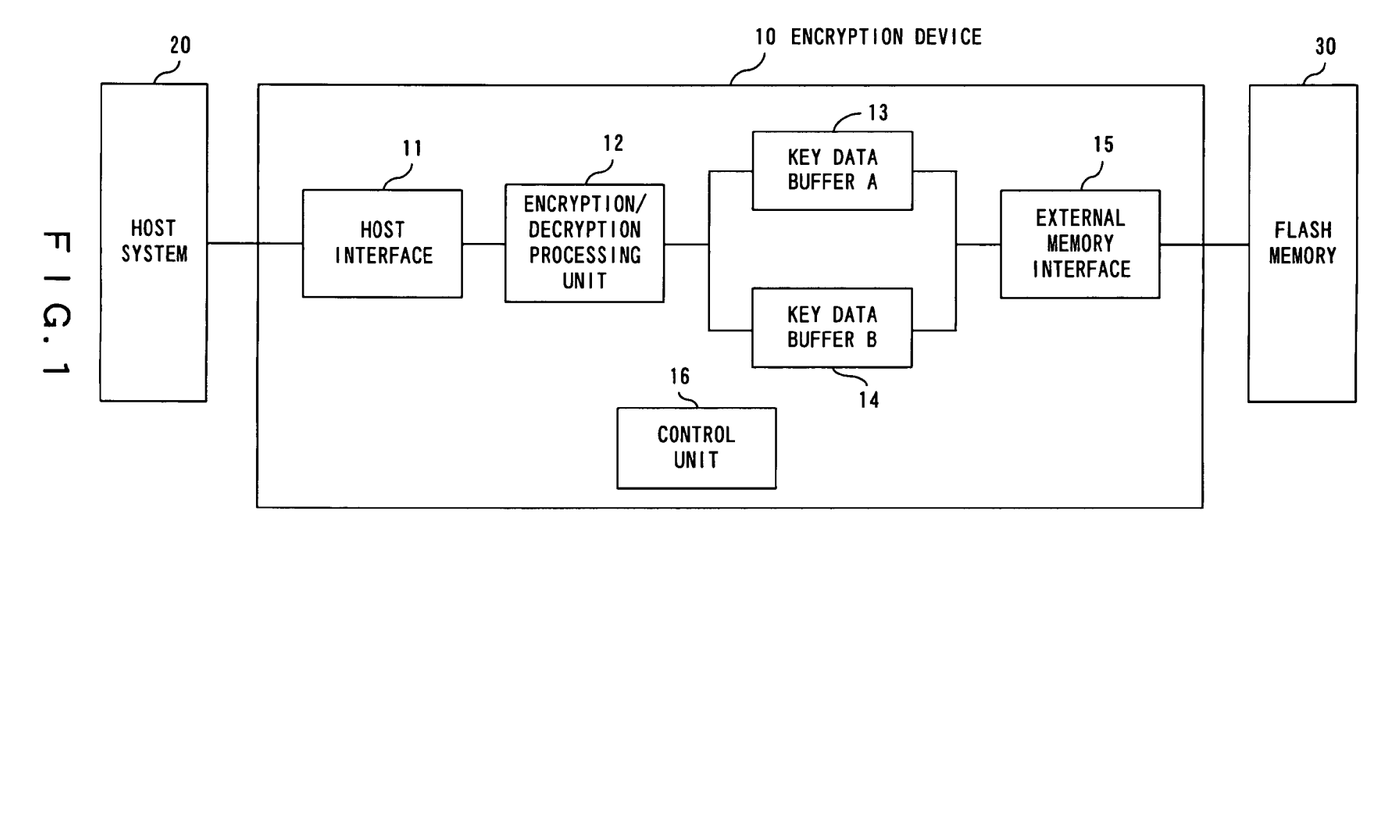
FIG. 1 is a diagram showing a configuration of an encryption device for implementing the present invention.

First, an explanation of FIG. 1 is provided below. FIG. 1 describes a configuration of an encryption device for implementing the present invention.

An encryption device 10 shown in FIG. 1 is connected to a host system 20 and flash memory 30.

The encryption device 10 of the present embodiments provides a function for encrypting unencrypted data transmitted from the host system 20 and transmitting back the encrypted data to the host system 20, and a function for decrypting encrypted data transmitted from the host system 20 and transmitting back the original data to the host system 20. Here, the flash memory 30 is used as an involatile memory device for preserving key data used for encryption and decryption in preparation for power supply interruption. However, in order to prevent the encrypted data from being decrypted by a malicious third party reading out the key data from the flash memory 30, the key data itself is encrypted and stored in the flash memory 30.

The encryption device 10 comprises a host interface 11, encryption/decryption processing unit 12, a key data buffer A 13, a key data buffer B 14, an external memory interface 15 and a control unit 16.

The host interface 11 exchanges various data with the host system 20.

The encryption/decryption processing unit 12 performs encryption/decryption of data transmitted from the host system 20 and encryption/decryption of key data. In the present embodiment, encryption/decryption by the encryption/decryption processing unit 12 uses a common key cryptosystem.

The key data buffer A 13 is a buffer for temporarily storing the key data encrypted by the encryption/decryption processing unit 12 (hereinafter referred to as "encrypted key data").

The key data buffer B 14 is a buffer for temporarily storing the unencrypted key data (hereinafter referred to as "unencrypted key data").

The external memory interface 15 controls the flash memory 30 attached to the encryption device 10 and carries out reading/writing of the encrypted key data.

The control unit 16 takes total control for operation of the encryption device 10 by controlling operations of each element constituting the encryption device 10.

Figure 2:
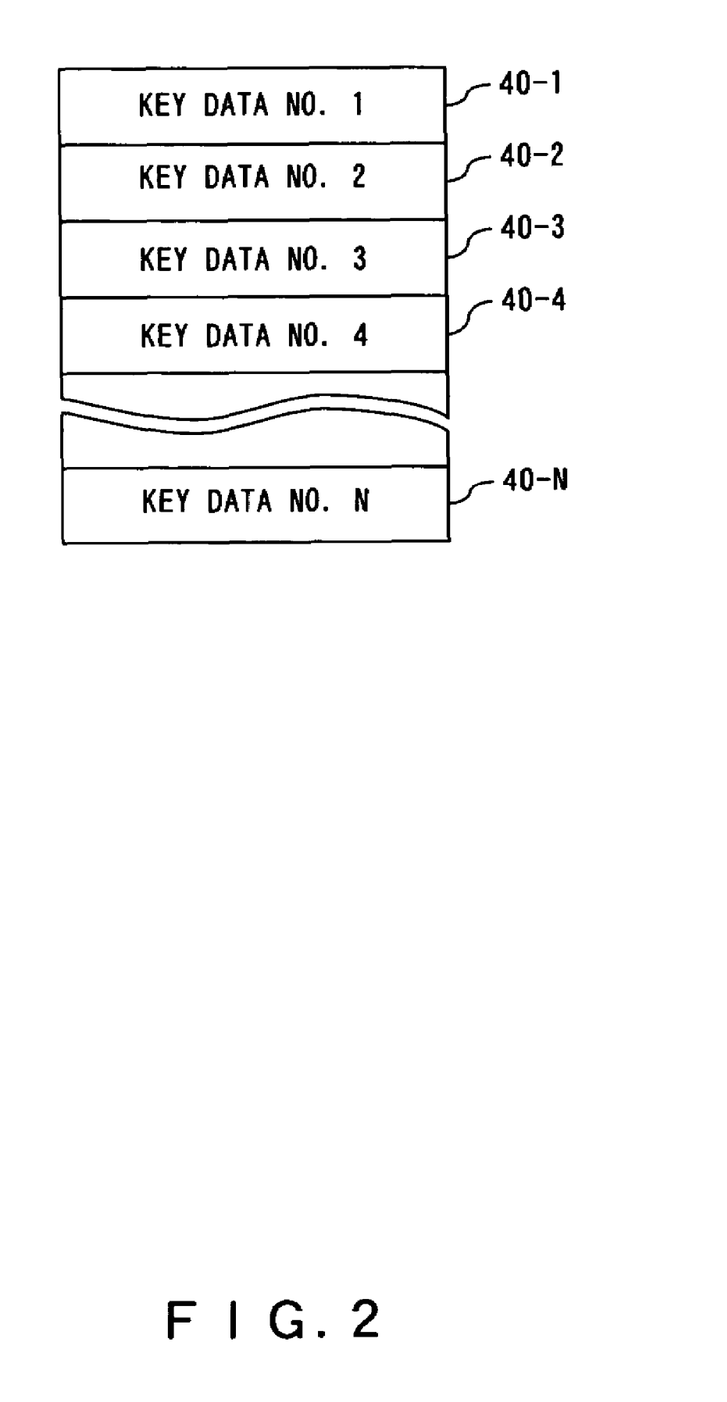
FIG. 2 is a memory map of key data buffers.

An explanation of FIG. 2 is provided next. FIG. 2 shows a memory map of the key data buffer A 13 and the key data buffer B 14. In the present embodiment, a plurality of key data are provided (N number of key data in FIG. 2), and each of the key data is stored in a way that the first key data is in a section 40-1 in FIG. 2; the second key data is in a section 40-2 in FIG. 2; the third key data is in a section 40-3 in FIG. 2; the fourth key data is in a section 40-4 in FIG. 2; ... and the Nth key data is in a section 40-N in FIG. 2. As explained above, the key data buffer A 13 stores encrypted key data and the key data buffer B 14 stores unencrypted key data.

The content of control performed by the control unit 16 of the encryption device 10 is explained in the following description.

Figure 3:
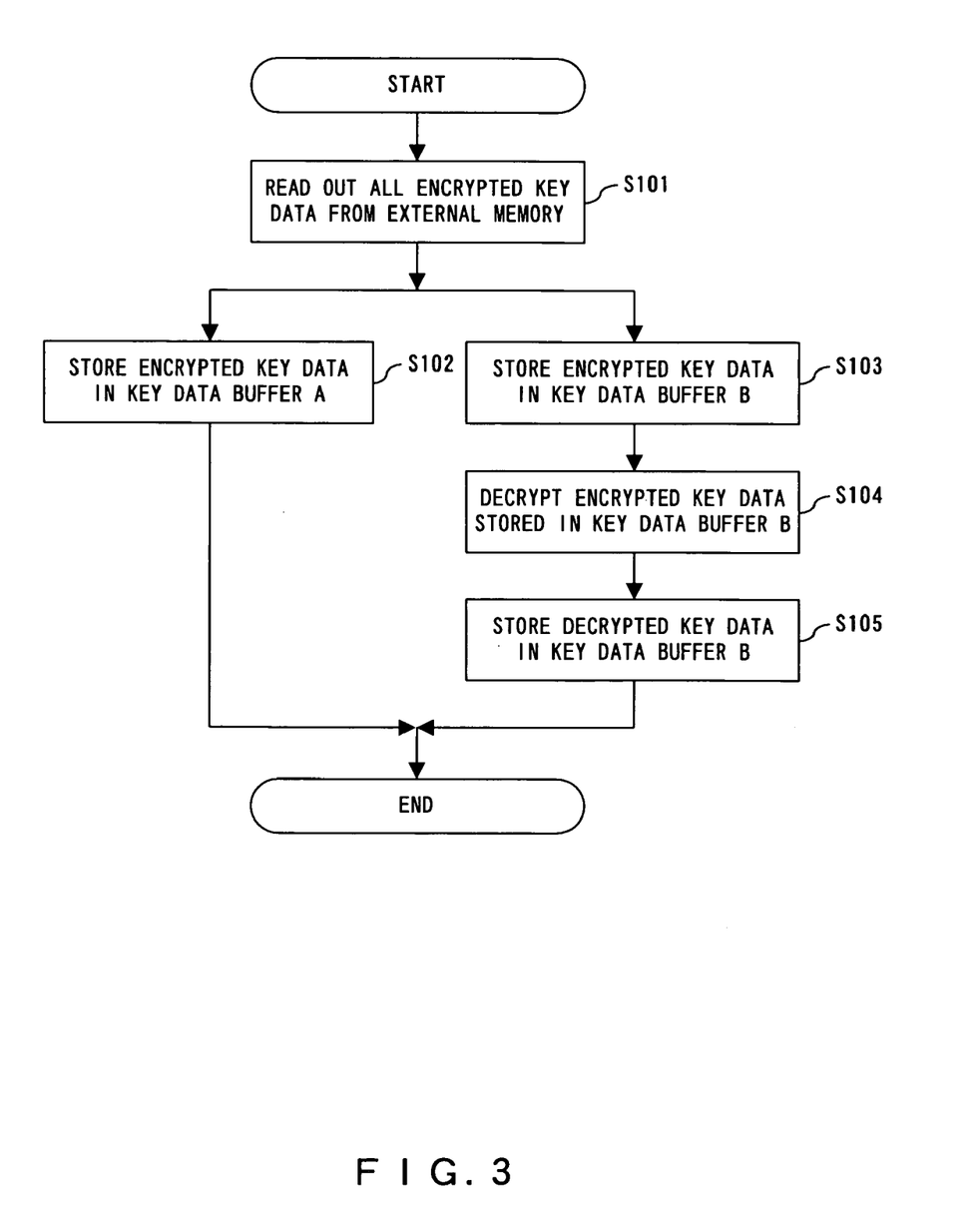
FIG. 3 shows processing content of start-up control in a flowchart.

First, an explanation of FIG. 3 is provided below. FIG. 3 shows processing content of start-up control processing performed by the control unit 16 in start-up of the encryption device 10 in a flowchart.

First, in S101 of FIG. 3, processing for reading of all encrypted key data from the external memory is performed. That is, processing for reading out all of the encrypted key data (N keys in the present embodiment) stored in the external memory, or the flash memory 30, is performed by controlling the external memory interface 15.

In S102, processing for storing the encrypted key data in the key data buffer A is performed. That is, processing for storing each of all encrypted key data, read out by the processing of S101, in each prescribed storage section of the key data buffer A 13, is performed.

On the other hand, among processing S103 through S105, performed in parallel with the above S102 processing, processing for storing the encrypted key data in the key data buffer is performed in S103. That is, processing for storing each of all encrypted key data read in the processing in S101 in each prescribed storage section of the key data buffer B14.

Later in S104, processing for decrypting the encrypted key data stored in the key data buffer B 14 is performed. That is, processing for decrypting all encrypted key data, stored in the key data buffer B 14, individually by the processing of S103 is performed, controlling the encryption/decryption processing unit 12. As hereinafter described, the encrypted key data stored in the flash memory 30 is key data encrypted by the encryption/decryption processing unit 12 using key data prepared in advance in the encryption/decryption processing unit 12; therefore it can be decrypted by the encryption/decryption processing unit 12.

In S105, processing for storing the decrypted key data in the key data buffer B 14 is performed. That is, processing for storing each of all key data (unencrypted key data) decrypted by the processing in S104 in the key data buffer B 14 is performed.

After completion of above processing, this start-up control processing is terminated.

The start-up control processing performed by the control unit 16 makes a state that a plurality of encrypted key data stored in the flash memory 30 is individually stored in the key data buffer A 13 and that the unencrypted key data decrypted from the encrypted key data is individually stored in the key data buffer B 14.

Figure 4:
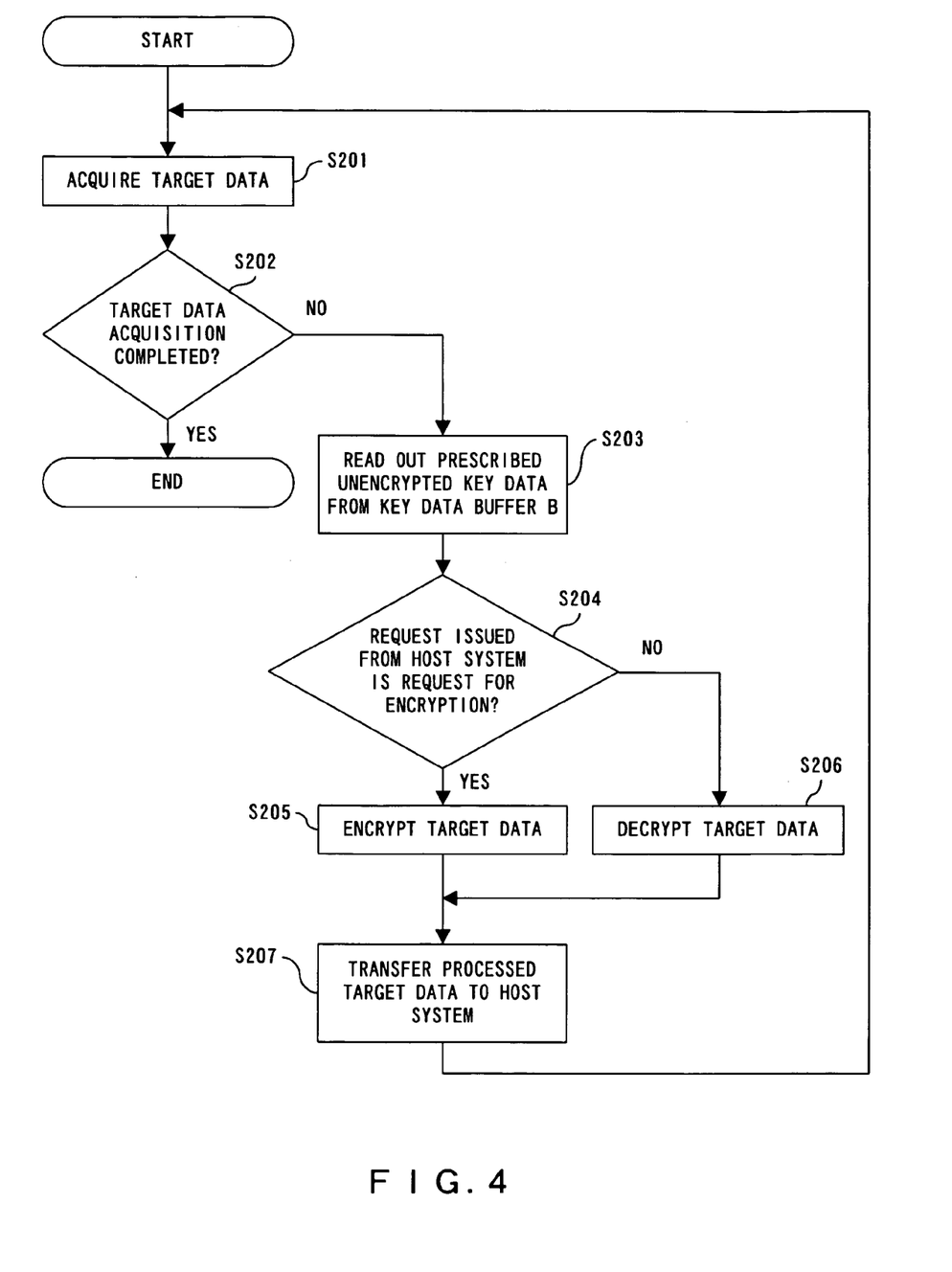
FIG. 4 shows processing content of encryption/decryption control processing in a flowchart.

An explanation of FIG. 4 is provided next. FIG. 4 shows processing content of encryption/decryption control processing performed by the control unit 16 in a flowchart. The processing in FIG. 4 is started when detecting that encryption or decryption request is issued by the host system 20 by the control unit 16 monitoring the host interface 11.

First in S201, processing for acquiring data to be encrypted/decrypted (hereinafter referred to as "target data") from the host system 20. That is, processing for acquiring the target data from the host system 20 controlling the host interface 11.

In S202, processing for determining whether acquisition of the target data is completed or not is performed. That is, determination of whether or not new target data is acquired, or in other words, whether or not the acquisition of the data to be encrypted/decrypted is all completed is performed. At this point, when the result is "Yes", that is when it is determined that acquisition of all data to be encrypted/decrypted is completed, the encryption/decryption control processing is terminated. On the other hand, when the result is "No", that is when target data is newly acquired, the processing proceeds to S203.

In S203, processing for reading out prescribed unencrypted key data from the key data buffer B 14, and for giving the key data to the encryption/decryption processing unit 12 is performed. At this point, when data encrypted as target data by the processing of the above-explained S201 (hereinafter referred to as "encrypted data") is acquired from the host system 20, unencrypted key data, used when encrypting the encrypted data, which can be found by being indicated on the target data for example, is read out from a plurality of unencrypted key data stored in the key data buffer B 14. When data not encrypted as target data in the processing of S201 (hereinafter referred to as "unencrypted data") is acquired from the host system 20, unencrypted key data, selected in accordance with a prescribed conditions or arbitrarily, is read out among a plurality of unencrypted key data stored in the key data buffer B 14.

In S204, processing for determining whether the request issued from the host system 20 is a request for encryption or not is performed. At this point, when the result is "Yes", that is when it is determined to be a request for encryption, the processing proceeds to S205. On the other hand, when the result is "No", that is when it is determined to be a request for decryption, the processing proceeds to S206.

In S205, processing for encrypting the target data is performed. That is, processing for encrypting the target data acquired by the processing in S201 using the unencrypted key data received by the processing in S203 is performed controlling the encryption/decryption processing unit 12.

In S206, processing for decrypting the target data is performed. That is, processing for decrypting the target data acquired by the processing in S201 using the unencrypted key data received by the processing in S203 is performed controlling the encryption/decryption processing unit 12.

In S207, processing for transferring the target data after processing to the host system 20 is performed. That is, processing for transferring the data after encryption or decryption by the encryption/decryption processing unit 12 in processing of S205 or S206 to the host system 20 is performed, controlling the host interface 11. After completion of this processing, processing returns to S201, and the above-explained processing is repeated again.

The processing described above is the encryption/decryption control processing. This processing, performed by the control unit 16 allows to provide the host system 20 with encrypted or decrypted target data, transmitted from the host system 20.

Figure 5:
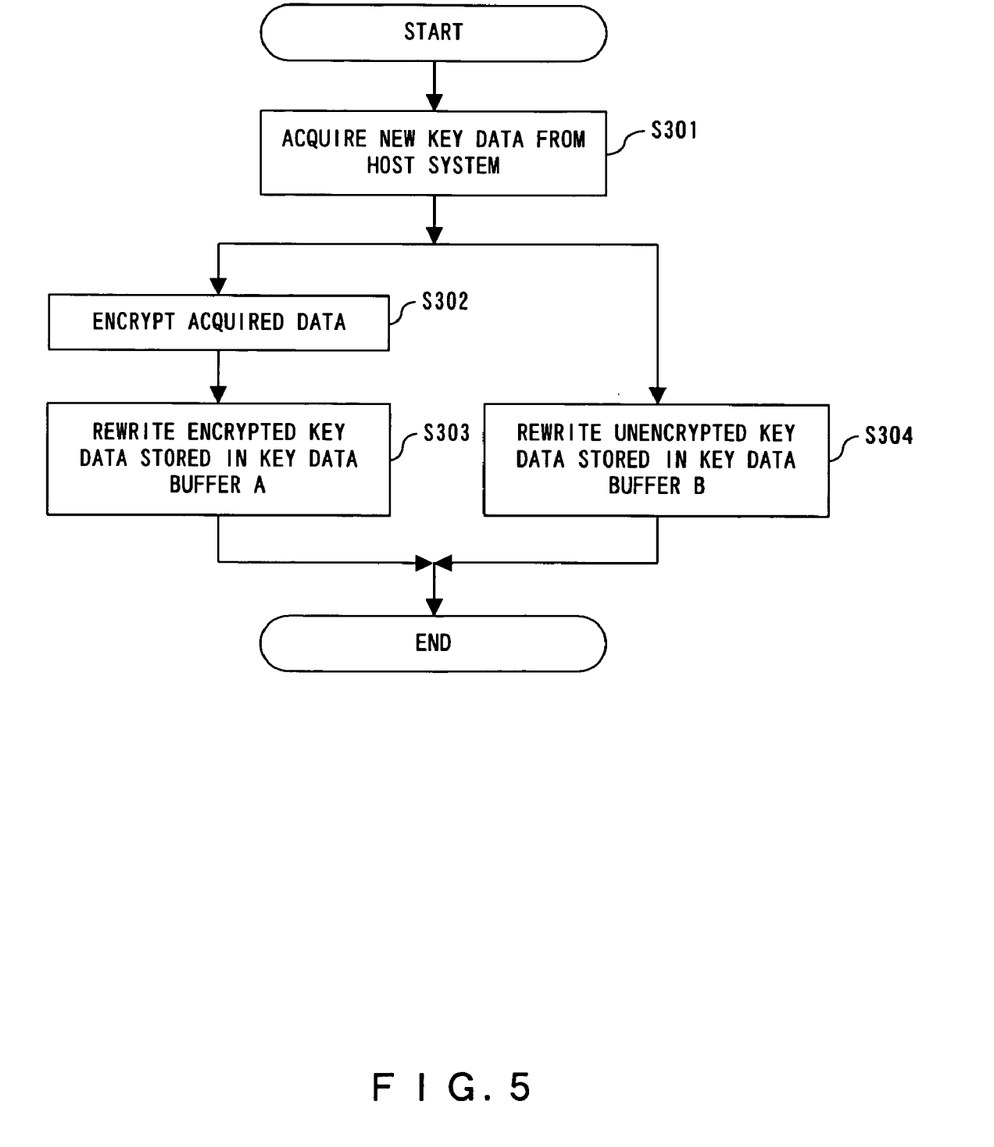
FIG. 5 shows processing content of the key data rewriting control processing in a flow chart.

FIG. 5 is explained next. FIG. 5 shows processing content of key data rewrite control processing performed by the control unit 16 in a flowchart. The processing shown in FIG. 5 is for processing to change key data in response to the instruction from the host system in order to make decryption of encrypted data difficult for a third party. This processing is started when detecting a request for key data change is issued from the host system 20 by the control unit 16 monitoring the host interface 11.

In S302 first, processing for acquiring new key data after change, relating to the request issued by the host system 20, from the host system 20 is performed controlling the host interface 11. This key data is not encrypted.

In S302, processing for encrypting the key data acquired by the processing in S301 is performed, controlling the encryption/decryption processing unit 12. In the present embodiments, encryption of the key data is performed using key data fixedly prepared in advance in the encryption/decryption processing unit 12.

In S303, processing for rewriting the encrypted key data designated by the request from the host system 20 among the encrypted data stored in the key data buffer A 13 into the encrypted key data acquired by the processing in S302.

On the other hand, in parallel with the above processing S302 and S303, in S304, processing for rewriting the unencrypted key data designated by the request from the host system 20 among the unencrypted data stored in the key data buffer B 14 into the unencrypted key data acquired from the host system 20 by the processing in S301.

After completion of the above processing, the key data rewrite control processing is terminated.

The key data rewrite control processing, performed by the control unit 16, rewrites key data used for encrypting/decrypting in the encryption device 10. In this rewriting, not all the data is rewritten but key data designated for rewriting alone is rewritten, and therefore encrypting and rewriting of key data can be performed within a short time compared with the time for rewriting all key data. Obviously it is also possible to rewrite all key data together.

Figure 6:
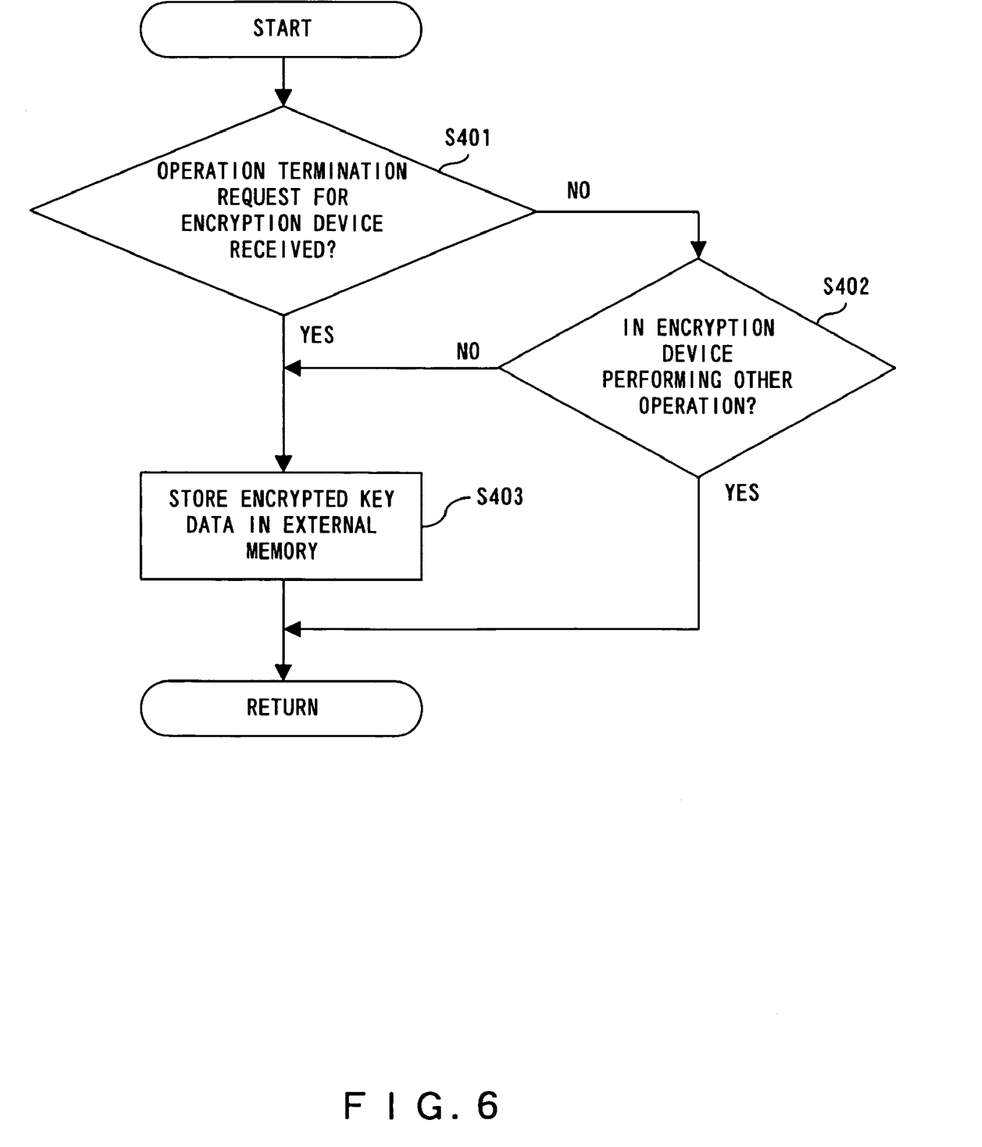
FIG. 6 shows processing content of the key data memory control processing in a flowchart.

Next, an explanation on FIG. 6 is provided below. FIG. 6 shows processing content of key data memory control processing performed by the control unit 16 in a flowchart. This processing is processing for writing encrypted key data in the flash memory 30 regardless of presence or absence of power supply by storing the encrypted key data in external memory, or the flash memory 30. The processing is interruption processing performed at a constant interval based on timekeeping by a timer in the control unit 16, and it is always performed when the control unit 16 receives a request to terminate operation of the encryption device 10 from the host system 20 via the host interface 11.

In FIG. 6, in S401 first, processing for determining whether or not the key data memory control processing has started upon receiving a request to terminate operation of the encryption device 10 is performed. At this point, when the result is "Yes", processing proceeds to S403, and when the result is "No", processing proceeds to S402.

In S402, processing for determining whether or not the encryption device 10 is performing the other operations, specifically start-up operation (see FIG. 3), encryption/decryption operation (see FIG. 4), or key data rewriting operation (see FIG. 5) etc., in the encryption/decryption processing unit 12 is performed. At this point, when the result is "Yes", the interruption processing is terminated and the processing returns to the ongoing processing without doing anything. On the other hand, when the result is "No", that is when the encryption device is not performing a particular operation and is in the waiting state, the processing proceeds to S403.

In S403, processing for storing encrypted key data in the external memory is performed. That is, processing for writing all key data stored in the key data buffer A 13 in the flash memory 30 is performed controlling the external memory interface 15. After the processing, the interruption processing is terminated, and the processing returns to the interrupted processing.

The processing explained above is the key data memory control processing. This processing, performed by the control unit 16, stores the encrypted key data in the flash memory 30 and thus the encrypted key data can be written in the flash memory 30 regardless of presence or absence of power supply.

As explained in detail above, the present invention configures an encryption device comprising an encryption unit for performing data encryption processing by using key data used as an encryption key, an encrypted key data storage unit for storing the encrypted key data, which is the key data encrypted by the encryption unit, an unencrypted key data storage unit for storing the key data stored in the encrypted key data storage means and the key data not encrypted, and an encrypted data memory control unit for writing the encrypted; key data stored in the encrypted key data storage unit, controlling an involatile memory device.

According to the present invention, this configuration has effects that there is little danger that encrypted data is decrypted even if encrypted key data is stolen by a third party, and that marked lowering of processing speed in encryption processing can be prevented.

Furthermore, the present invention is not limited to the embodiments described above, and many modifications and variations can be made thereto.

What is claimed is:

1. A device, which performs encryption, comprising:
   an encryption processing unit to encrypt data using key data as an encryption key;
   an encrypted key data storage unit to store encrypted key data, which is the key data encrypted by the encryption processing unit;
   an unencrypted key data storage unit to store unencrypted key data, which corresponds to the encrypted key data stored in the encrypted key data storage unit; and
   an encrypted data memory control unit to write the encrypted key data, stored in the encrypted key data storage unit, in an involatile memory device, by controlling the memory device.

2. The device according to claim 1, wherein the encryption processing unit performs encryption processing of the data transmitted from a host system by using the key data stored in the unencrypted key data storage unit.

3. The device according to claim 1, wherein the encrypted data memory control unit controls writing the encrypted key data when the encryption processing by the encryption processing unit is not performed.

4. The device according to claim 1, wherein when starting up the device, the encrypted data memory control unit controls reading out the encrypted key data from the memory device, and storing the encrypted key data in the encrypted key data storage unit.

5. The device according to claim 4, wherein the encrypted processing unit is able to decrypt data encrypted on its own and performs decryption of the encrypted key data read by the encrypted data memory control unit in start-up of the device, and the key data, decrypted by the decryption processing, is stored in the unencrypted key data storage unit.

6. The device according to claim 1, wherein the unencrypted key data storage unit stores a plurality of the key data, and when rewriting instruction of the key data is transmitted from a host system, key data relating to the instruction among a plurality of key data stored in the unencrypted key data storage unit is rewritten.

7. The device according to claim 1, wherein the encrypted key data storage unit stores a plurality of the encrypted key data, and when rewriting instruction of the key data is transmitted from a host system, key data relating to the instruction alone among a plurality of encrypted key data stored in the encrypted key data storage unit is encrypted by the encryption processing unit and is rewritten.

8. A method of storing encrypted data, comprising:
   storing encrypted data and encrypted key data representing key data used to encrypt the encrypted data, on a memory device, the key data being encrypted before being stored as the encrypted key data, the memory device preserving the encrypted data and the encrypted key data stored therein when no power is provided to the memory device, wherein the encrypted key data is stored after encryption of data to generate the stored encrypted data is completed; and
   decrypting data using the key data stored in a memory of an encryption/decryption apparatus, wherein the key data is read from the memory device and decrypted when communication between the memory device and the encryption/decryption apparatus is established.

* * * * *